(12) United States Patent
Moore

(10) Patent No.: US 7,397,728 B2
(45) Date of Patent: Jul. 8, 2008

(54) METHOD FOR PROCESSING A RECORD OF SEISMIC TRACES

(75) Inventor: Ian Moore, Trigg (AU)

(73) Assignee: WesternGeco L.L.C., Houston, TX (US)

( * ) Notice: Subject to any disclaimer, the term of this patent is extended or adjusted under 35 U.S.C. 154(b) by 93 days.

(21) Appl. No.: 11/213,219

(22) Filed: Aug. 26, 2005

(65) Prior Publication Data

US 2007/0064530 A1 Mar. 22, 2007

(51) Int. Cl.
*G01V 1/32* (2006.01)
*G01V 1/36* (2006.01)
(52) U.S. Cl. ............................ 367/46; 367/38; 367/50
(58) Field of Classification Search .................... 367/38, 367/46, 50
See application file for complete search history.

(56) References Cited

U.S. PATENT DOCUMENTS

| 4,884,247 | A | * | 11/1989 | Hadidi et al. | ............... | 367/43 |
| 5,920,828 | A | * | 7/1999 | Norris et al. | ............... | 702/14 |
| 5,970,023 | A | * | 10/1999 | Chambers et al. | ............ | 367/46 |
| 6,763,304 | B2 | * | 7/2004 | Schonewille | ................ | 702/14 |
| 7,222,023 | B2 | * | 5/2007 | Laurent et al. | ............... | 702/18 |

OTHER PUBLICATIONS

Matson, et al. "A comparison of three multiple'attenuation methods applied to a hard water-bottom data set." The Leading Edge, Jan. 1999.*

Toverud, et al. "Comparison of seismic attenuation models using zero-offset vertical seismic profiling "VSP" data." Geophysics, vol. 70, No. 2 (Mar.-Apr. 2005).*

Somerville, et al. "A fast and accurate Q-inverse filter." CSEG Geophysics 2002.*

Gelius,L.J. "Inverse Q-Filtering. A Spectral Balancing Technique." Geophysical Prospecting, vol. 35, pp. 656-667, Jul. 1987.*

Hale, "Q-adaptive deconvolution," *Stanford Exploration Project*, Report 30, pp. 133-158, 1982.

UK Search Report dated Nov. 30, 2006 for Application No. GB 0615798.6.

Whitmore and Garing, "Interval velocity estimation using iterative prestack depth migration in the constant angle domain," *The Leading Edge*, 2(7):757-762, 1993.

Hargreaves, N. D. and Calvert, A. J., 1991, Inverse Q filtering by Fourier transform, Geophysics, vol. 56, p. 519-527.

* cited by examiner

*Primary Examiner*—Jack W Keith
*Assistant Examiner*—Scott A Hughes
(74) *Attorney, Agent, or Firm*—Ari Pramudji; Liangang (Mark) Ye; Jeffrey E. Griffin

(57) ABSTRACT

An apparatus and method for processing a record of seismic traces. The method includes receiving the record of seismic traces in a time-offset domain, transforming the record of seismic traces to a tau-p domain, applying a zero offset inverse Q algorithm to the record of seismic traces in the tau-p domain, and transforming the record of seismic traces back to the time-offset domain.

25 Claims, 4 Drawing Sheets

METHOD FOR PROCESSING A RECORD OF SEISMIC TRACES

BACKGROUND OF THE INVENTION

1. Field of the Invention

One or more embodiments of the present invention generally relate to seismic data processing, and more particularly to correcting seismic data from dissipative effects.

2. Description of the Related Art

In seismic exploration, seismic data are obtained by first creating an artificial disturbance along the earth by use of dynamite or the like. The resulting acoustic waves travel downwardly in the earth and are reflected upward from subsurface reflecting interfaces. The reflected waves are received at detectors or geophones located along the ground and recorded in reproducible form. Ideally, the signals recorded at the detectors would be exactly representative of the reflection characteristics of the earth without the presence of any undesirable components, such as noise or distortion.

Unfortunately, the signals recorded at the detectors often contain many undesirable components which obscure the reflectivity function of the earth and prevent the finding of an area of the earth where oil and gas deposits may be present. Several phenomena exist in causing distortion to the recorded signals. One such phenomenon is absorption, which causes the actual loss of seismic energy by converting it to other forms of energy. This type of loss of seismic energy is generally known as intrinsic attenuation. A second phenomenon is intrabed multiple interference. Intrabed multiple interference redistributes seismic energy between downward and upward directions. This type of loss of seismic energy is generally known as apparent attenuation. Apparent attenuation causes progressive loss of the higher frequencies (broadening of the seismic wavelet) and increasing phase distortion with increasing traveltime for the received seismic wavelet.

The combination of intrinsic and apparent attenuation is generally known as the earth filter. As a result of earth filtering, the seismic wavelet is time varying. The existence of a time varying seismic wavelet violates a basic assumption of deconvolution theory and impairs the ability to use deconvolution to determine the earth filter characteristics as part of a method of seismic interpretation.

One conventional approach to compensate for earth filter attenuation is disclosed in *Q-Adaptive Deconvolution*, by D. Hale, Stanford Exploration Project, Report 30, 1982. Hale discloses two iterative procedures for implementing inverse Q-filtering. The procedures disclosed by Hale make several assumptions which cause Hale to arrive at an approximate dispersion relationship. Use of the approximate dispersion relationship, however, degrades the value of the Q compensation obtained by Hale.

Further, application of zero offset inverse Q algorithm to prestack data (or data having non zero offsets) in the t–x domain often leads to insufficient compensation, because events having similar traveltimes may have experienced substantially different levels of attenuation along their raypaths. This phenomenon may be particularly true in deep water and at high offsets. In those situations, the reflection from the water bottom, which has experienced no attenuation, may coincide in arrival time with much deeper reflections that may have experienced significant attenuation. As such, a single Q filter may not be sufficient to accurately compensate for the reflections.

Therefore, a need exists in the art for a new method for correcting input seismic data from dissipative effects.

SUMMARY OF THE INVENTION

Various embodiments of the invention are directed to a method for processing a record of seismic traces. The method includes transforming the record of seismic traces to a constant angle domain such that each seismic trace corresponds to a constant angle. The constant angle is defined as an angle between a ray path and a vertical axis at a surface. The method further includes applying a zero offset inverse Q algorithm to the record of seismic traces in the constant angle domain.

In one embodiment, the record of seismic traces has a variety of offsets.

In another embodiment, applying the zero offset inverse Q algorithm to the record of seismic traces includes converting a Q model for the zero offset inverse Q algorithm to a function of tau.

In yet another embodiment, the zero offset inverse Q algorithm is applied to the record of seismic traces using the Q model as a function of tau.

In still yet another embodiment, the Q model as a function of tau is defined by $d\tau/dt \ Q(t_0(\tau))$, wherein $d\tau$ represents a change in tau, dt represents a change in traveltime and $t_0$ represents vertical time and $\tau$ represents tau.

In yet another embodiment, applying the zero offset inverse Q algorithm to the record of seismic traces includes converting the record of seismic traces to a traveltime-p domain.

In yet another embodiment, applying the zero offset inverse Q algorithm to the record of seismic traces further includes applying the zero offset inverse Q algorithm to the record of seismic traces using the Q model as a function of traveltime.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
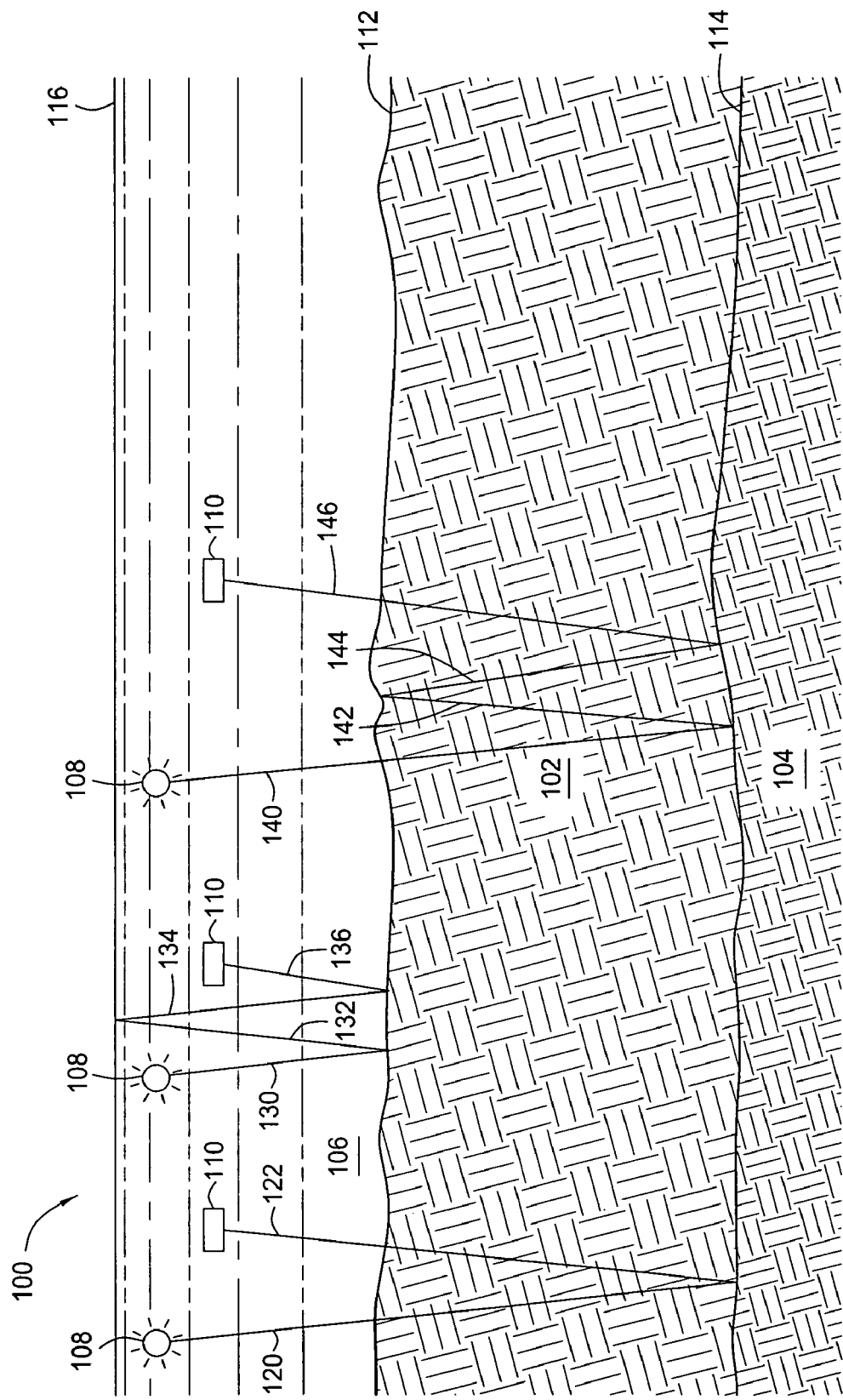
FIG. 1 illustrates a schematic view of marine seismic surveying for which various embodiments of the invention may be used.

One or more embodiments of the invention may be used in connection with various seismic surveying, such as marine seismic surveying, land seismic surveying, seabed seismic surveying, bore hole seismic surveying and the like. FIG. 1 illustrates a schematic view of marine seismic surveying 100 for which various embodiments of the invention may be used. Subterranean formations to be explored, such as 102 and 104, lie below a body of water 106. Seismic energy sources 108 and seismic receivers 110 are positioned in the body of water 106, typically by one or more seismic vessels (not shown). A seismic source 108, such as an air gun, creates seismic waves in the body of water 106 and a portion of the seismic waves travels downward through the water toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between subterranean formation, such as interface 114 between formations 102 and 104. When the reflected waves traveling upward reach the water/air interface at the water surface 116, a majority portion of the waves reflects downward again. Continuing in this fashion, seismic waves can reflect multiple times between upward reflectors, such as the water bottom 112 or formation interface 114, and the downward reflector at the water surface 116 above. Each time the reflected waves propagate past the position of a seismic receiver 110, the receiver 110 senses the reflected waves and generates representative seismic signals. These seismic signals may then be used to yield valuable information regarding the geophysical characteristics of the explored subterranean formations.

Figure 2:
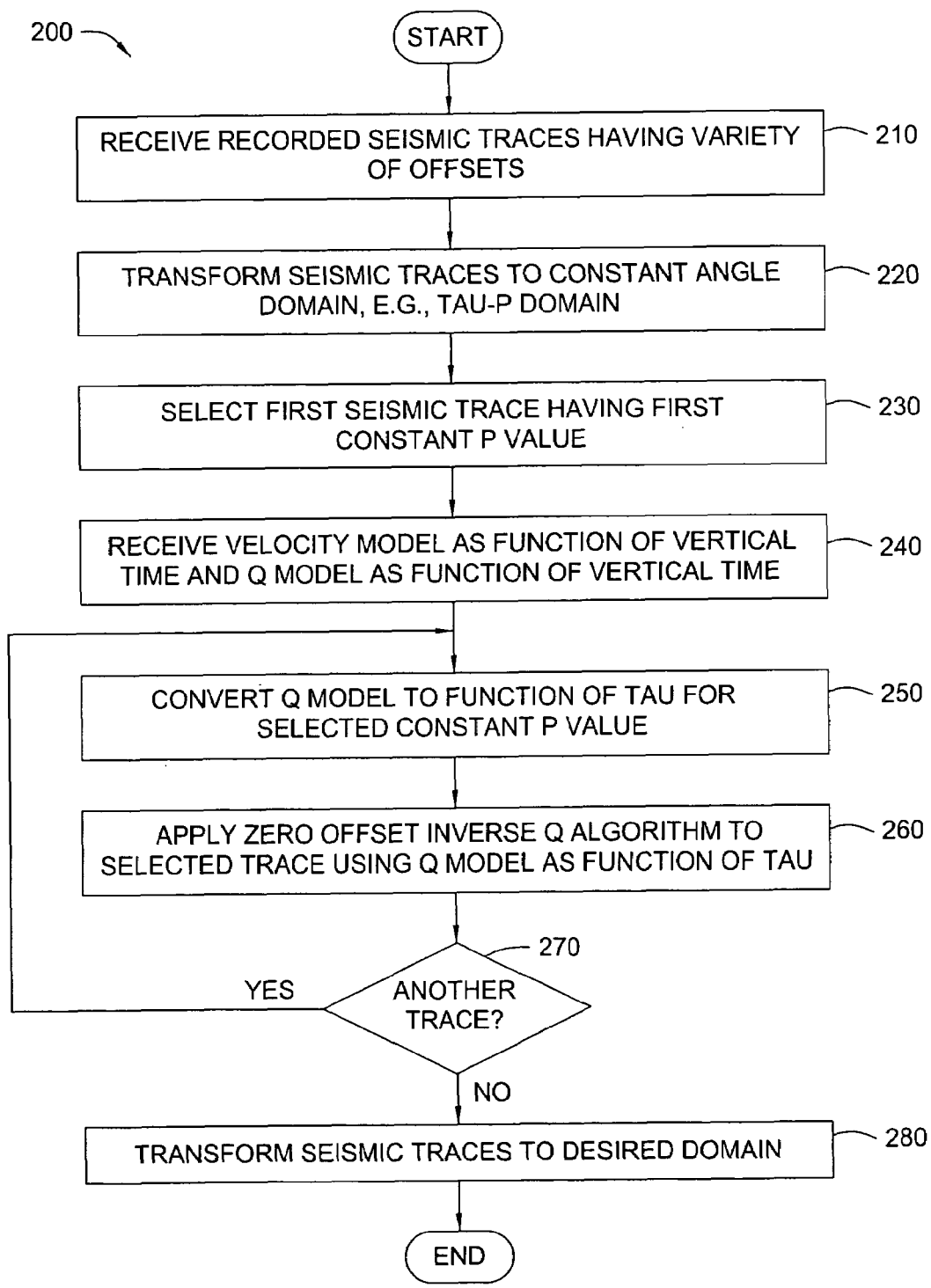
FIG. 2 illustrates a method for correcting a record of seismic traces from dissipative effects in the earth in accordance with one or more embodiments of the invention.

FIG. 2 illustrates a method 200 for correcting a record of seismic traces from dissipative effects in the earth in accordance with one or more embodiments of the invention. At step 210, the record of seismic traces having a variety of offsets is received. In one embodiment, the variety of offsets facilitates the conversion of the seismic traces to a constant angle domain, as described below with reference to step 220. In another embodiment, the recorded seismic traces are in time-offset (t–x) domain. The seismic traces having the variety of offsets may be recorded and received by any process commonly known by persons having ordinary skill in the art.

At step 220, the recorded seismic traces are transformed to a domain where each seismic trace corresponds to a constant angle, wherein the constant angle is defined as the angle between a ray and the vertical axis at the surface, e.g., water or land surface. Although various embodiments described herein are with reference to marine surveying, those embodiments may also be used in connection with land surveying. As such, the recorded seismic traces may be transformed to a constant angle domain, which may also be referred to as the ray parameter domain or emergent angle domain. In one embodiment, the recorded seismic traces are transformed to a tau-p domain. In another embodiment, the transformation process may involve transforming the seismic traces to an f–k domain. The transformation may be performed using linear Radon transform or any other process commonly known by persons having ordinary skill in the art.

Once the recorded seismic traces have been transformed to the constant angle domain, the seismic traces may be referred to as p-traces. At step 230, a first seismic trace having a first p (or constant angle) value is selected. At step 240, a velocity model as a function of $t_0$ and a Q model as a function of $t_0$ are received, where $t_0$ may represent the vertical time or zero offset time.

At step 250, the Q model is converted to a function of tau for the selected p (or constant angle) value. In one embodiment, this conversion may only be performed once if the Q model and the velocity model do not vary spatially. In accordance with various embodiments of the invention, method 200 describes processing of a single prestack record (or gather), which may be at some fixed spatial location. However, the Q as a function of tau computed for a previous record may be reused for processing subsequent records at different spatial locations.

At step 260, a zero offset inverse Q algorithm (or filter) is applied to the selected trace using the Q model as a function of tau. At step 270, a determination is made as to whether another seismic trace, e.g., a second seismic trace having a second p (or constant angle) value, from the record of seismic traces in the constant angle domain needs to be processed. If the answer is in the affirmative, then processing returns to step 250 where the Q model is converted to a function of tau for the second p (or constant angle) value. Steps 250-270 continue until each seismic trace with its respective p (or constant angle) value from the record of seismic traces in the constant angle domain has been processed. If the answer is in the negative, then processing continues to step 280.

At step 280, the recorded seismic traces may be transformed to a desired domain, such as a time-offset (t–x) domain. In one embodiment, this transformation may be performed using an inverse linear Radon transform or any other method commonly known by persons having ordinary skill in the art. In another embodiment, the recorded seismic traces may remain in the tau-p domain for further processing.

In this manner, method 200 may be used to remove (or compensate for) the Q effects or the attenuation caused by the earth from the record of seismic traces. Various embodiments of the invention illustrate that when a one dimensional model assumption is appropriate, i.e., a model made up of substantially horizontal layers, inverse-Q filters may be applied to pre-stack seismic traces in the tau-p domain for accurate compensation. Moreover, any time-variant, inverse-Q algorithm that is accurate for zero-offset seismic traces may be used to perform the filter application described herein. In one embodiment, the tau-p transform discussed above with reference to step 220 may be combined with other tau-p domain filtering (e.g., for addressing noise and multiple attenuations) to avoid additional cost involved with performing the tau-p transform.

Figure 3:
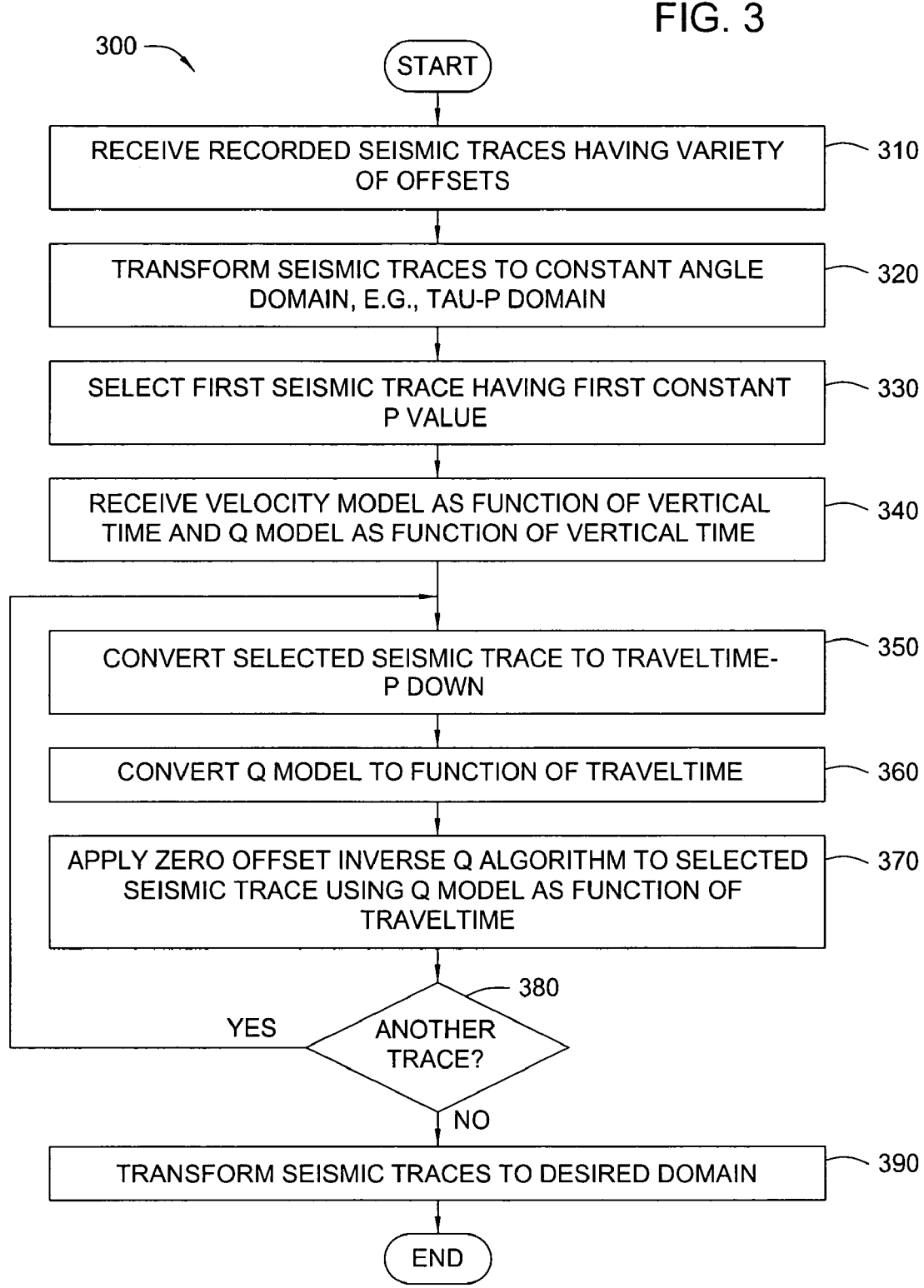
FIG. 3 illustrates another method for correcting a record of seismic traces from dissipative effects in the earth in accordance with one or more embodiments of the invention.

FIG. 3 illustrates a method 300 for correcting a record of seismic traces from dissipative effects in the earth in accordance with one or more embodiments of the invention. Steps 310-330 are the same as steps 210-230. Accordingly, details of steps 310-330 are provided with reference to steps 210-230 above.

At step 340, a velocity model as a function of $t_0$ and a Q model as a function of $t_0$ are received, where $t_0$ may represent the vertical time or zero offset time. At step 350, the selected seismic trace is converted from the tau-p domain to a travel-time-p domain, where traveltime may also be commonly referred to as time along the ray. This conversion may involve stretching the trace.

At step 360, the Q model is converted from a function of $t_0$ to a function of traveltime, i.e., Q(t), where t represents traveltime. At step 370, a zero offset inverse Q algorithm (or filter) is applied to the selected seismic trace using the Q model as a function of traveltime.

At step 380, a determination is made as to whether another seismic trace, e.g., a second seismic trace having a second constant p value, from the record of seismic traces in the constant angle domain needs to be processed. If the answer is in the affirmative, then processing returns step 350. If the answer is in the negative, then processing continues to step 390.

At step 390, the recorded seismic traces may be transformed to a desired domain, such as a time-offset (t–x) domain. In one embodiment, this transformation may be performed using an inverse linear Radon transform or any other method commonly known by persons having ordinary skill in the art. In another embodiment, the recorded seismic traces may remain in the tau-p domain for further processing. In this manner, method 300 may also be used to remove (or compensate for) the Q effects or the attenuation caused by the earth from the record of seismic traces.

The following paragraphs describe a mathematical derivation for the conversion of Q model as a function of vertical time $t_0$ to Q model as a function of tau. If a ray has a fixed ray parameter (slowness) p, then the angle between the ray and the vertical may be defined by $\theta(t_0)$ with $p=\sin(\theta)/v$, where $t_0$ represents the vertical time or zero offset time, and not traveltime. If the vertical time $t_0$ is fixed, then the traveltime and the offset may be expressed as:

$$t = \int_0^0 dt'_0 / \cos(\theta) \quad \text{Equation (1)}$$

$$x = \int_0^0 v\tan(\theta) dt'_0 \quad \text{Equation (2)}$$

where v and $\theta$ are functions of $t_0'$ within the integrand. For an event at fixed $t_0$, $dt/dx=p$. Therefore, the zero-offset time may be expressed as:

$$\tau = t - x\, dt/dx = t - px \quad \text{Equation (3).}$$

Substituting t from Equation (1) and x from Equation (2) into Equation (3) gives an equation relating $\tau$ and $t_0$, where $\tau$ is tau. For a given $t_0$ and p, Equation (3) gives the zero-offset time, $\tau$, of the event in the $\tau$–p domain.

Since the inverse-Q filters depend on t/Q, where t is the traveltime along the ray, it is necessary that $d\tau/Q(\tau, p)=dt/Q(t_0(\tau))$, where $d\tau$ is the change in $\tau$ corresponding to dt, which is a change in t. Therefore, $Q(\tau, p)=d\tau/dt\, Q(t_0(\tau))$.

For a layered medium having a constant velocity, the integrations in Equations (1) and (2) may become summations. Consider the $i^{th}$ layer, for which $Q=Q_i$ and $v=v_i$. At a fixed p, the angle $\theta_i$ between the ray and the vertical is also known. If the vertical thickness of the layer (as a two-way time) is $dt_{0,i}$, then the time along the ray may be represented by $dt_i=dt_{0,i}/\cos(\theta_i)$, and the horizontal offset in the layer may be represented by $dx_i=dt_{0,i}\, v_i\, \tan(\theta_i)$.

The increment in $\tau$ for that layer may be represented by $d\tau_i=dt_i-dx_i\, p=dt_{0,i}\cos(\theta_i)=dt_i\cos^2(\theta_i)$.

This derivation may then provide an algorithm for constructing $Q(\tau,p)$ layer by layer. For a reflection within the top layer (i=1) at time $\tau$ in the $\tau$–p domain, the actual travel time along the ray is given by $t=\tau/\cos^2(\theta_1)$. Hence, $Q(\tau,p)$ may be represented as $Q(\tau, p)=\tau/t\, Q(t_0(\tau))=\cos^2(\theta_1)\, Q_1$.

The "thickness" of the layer may be expressed as $d\tau_1=dt_{0,1}\cos(\theta_1)$. Similarly, the other layers in the medium may be included simply by scaling the interval Q values by $\cos^2(\theta)$ and the zero-offset times by $\cos(\theta)$.

Further, some regions of the $\tau$–p domain may not be physical, i.e., rays with a given slowness, p, may only travel in layers with a velocity such that pv<1. Layers including and below the shallowest layer for which this inequality does not hold may not be reached by energy originating from near the surface and having this slowness. This criterion defines a critical $\tau$ for each p-trace separating the physical region (earlier $\tau$) from the non-physical region (later $\tau$). No source-related energy should exist in the non-physical region. Hence, a large Q value may be assigned below the critical $\tau$ value to avoid amplifying noise or artifacts.

Figure 4:
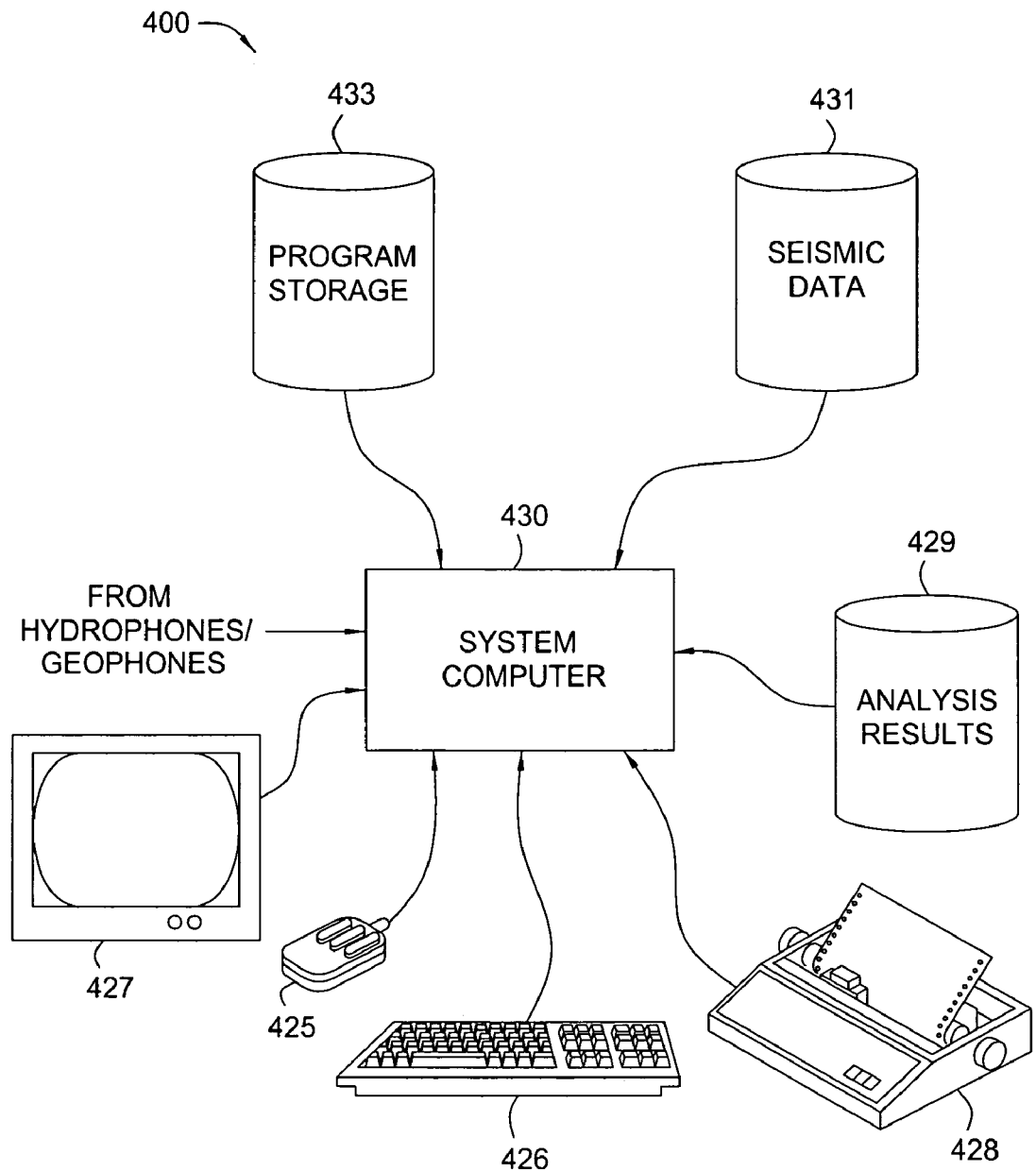
FIG. 4 illustrates a computer network, into which embodiments of the invention may be implemented.

FIG. 4 illustrates a computer network 400, into which embodiments of the invention may be implemented. The computer network 400 includes a system computer 430, which may be implemented as any conventional personal computer or workstation, such as a UNIX-based workstation. The system computer 430 is in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one embodiment, seismic data from hydrophones are stored in disk storage device 431. The system computer 430 may retrieve the appropriate data from the disk storage device 431 to perform the seismic traces correction method according to program instructions that correspond to the methods described herein. The program instructions may be written in a computer programming language, such as C++, Java and the like. The program instructions may be stored in a computer-readable memory, such as program disk storage device 433. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 430 presents output primarily onto graphics display 427, or alternatively via printer 428. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

The system computer 430 may be located at a data center remote from the survey region. The system computer 430 is in communication with hydrophones (either directly or via a recording unit, not shown), to receive signals indicative of the reflected seismic energy. These signals, after conventional formatting and other initial processing, are stored by the system computer 430 as digital data in the disk storage 431 for subsequent retrieval and processing in the manner described above. While FIG. 4 illustrates the disk storage 431 as directly connected to the system computer 430, it is also contemplated that the disk storage device 431 may be accessible through a local area network or by remote access. Furthermore, while disk storage devices 429, 431 are illustrated as separate devices for storing input seismic data and analysis results, the disk storage devices 429, 431 may be implemented within a single disk drive (either together with or separately from program disk storage device 433), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for processing a record of seismic traces, comprising:
    transforming the record of seismic traces to a constant angle domain such that each seismic trace corresponds to a constant angle, wherein the constant angle is defined as an angle between a ray path and a vertical axis at a surface;
    applying a zero offset inverse Q algorithm to the record of seismic traces in the constant angle domain; and
    saving the record of seismic traces to a storage device.

2. The method of claim 1, further comprising transforming the record of seismic traces to a time-offset domain.

3. The method of claim 2, wherein the record of seismic traces is transformed to the time-offset domain using an inverse linear Radon transform.

4. The method of claim 1, wherein the record of seismic traces comprises a variety of offsets.

5. The method of claim 1, wherein the surface is a water surface.

6. The method of claim 1, wherein transforming the record of seismic traces to the constant angle domain comprises transforming the record of seismic traces to a tau-p domain.

7. The method of claim 1, wherein transforming the record of seismic traces to the constant angle domain comprises transforming the record of seismic traces to an f–k domain.

8. The method of claim 1, wherein the record of seismic traces is transformed to the constant angle domain using a linear Radon transform operation.

9. The method of claim 1, wherein the constant angle domain is a tau-p domain.

10. The method of claim 1, wherein the constant angle domain is a ray parameter domain.

11. The method of claim 1, wherein applying the zero offset inverse Q algorithm to the record of seismic traces comprises converting a Q model for the zero offset inverse Q algorithm to a function of tau.

12. The method of claim 11, wherein the zero offset inverse Q algorithm is applied to the record of seismic traces using the Q model as a function of tau.

13. The method of claim 11, wherein the Q model as a function of tau is defined by $d\tau/dt\ Q(t_0(\tau))$, wherein $d\tau$ represents a change in tau, dt represents a change in traveltime and $t_0$ represents vertical time and $\tau$ represents tau.

14. The method of claim 1, wherein applying the zero offset inverse Q algorithm to the record of seismic traces comprises converting a Q model for the zero offset inverse Q algorithm to a function of tau for each constant angle that corresponds to each seismic trace.

15. The method of claim 1, wherein applying the zero offset inverse Q algorithm to the record of seismic traces comprises converting the record of seismic traces to a traveltime-p domain.

16. The method of claim 15, wherein applying the zero offset inverse Q algorithm to the record of seismic traces further comprises converting a Q model for the zero offset inverse Q algorithm to a function of traveltime.

17. The method of claim 16, wherein applying the zero offset inverse Q algorithm to the record of seismic traces further comprises applying the zero offset inverse Q algorithm to the record of seismic traces using the Q model as a function of traveltime.

18. A method for processing a record of seismic traces, comprising:
   receiving the record of seismic traces in a time-offset domain;
   transforming the record of seismic traces to a tau-p domain;
   applying a zero offset inverse Q algorithm to the record of seismic traces in the tau-p domain; and
   transforming the record of seismic traces back to the time-offset domain.

19. A computer system, comprising:
   a processor; and
   a memory comprising program instructions executable by the processor to:
      transform a record of seismic traces to a constant angle domain such that each seismic trace corresponds to a constant angle, wherein the constant angle is defined as an angle between a ray path and a vertical axis at a surface; and
      apply a zero offset inverse Q algorithm to the record of seismic traces in the constant angle domain.

20. The computer system of claim 19, wherein the memory further comprises program instructions executable by the processor to transform the record of seismic traces to a time-offset domain.

21. The computer system of claim 19, wherein the record of seismic traces comprises a variety of offsets.

22. The computer system of claim 19, wherein the constant angle domain is a tau-p domain.

23. The computer system of claim 19, wherein the program instructions executable by the processor to transform the record of seismic traces to the time-offset domain comprises program instructions executable by the processor to convert a Q model for use in connection with the zero offset inverse Q algorithm to a function of tau.

24. The computer system of claim 23, wherein the zero offset inverse Q algorithm is applied to the record of seismic traces using the Q model as a function of tau.

25. The computer system of claim 19, wherein the surface is a water surface.

* * * * *